Figure 1:
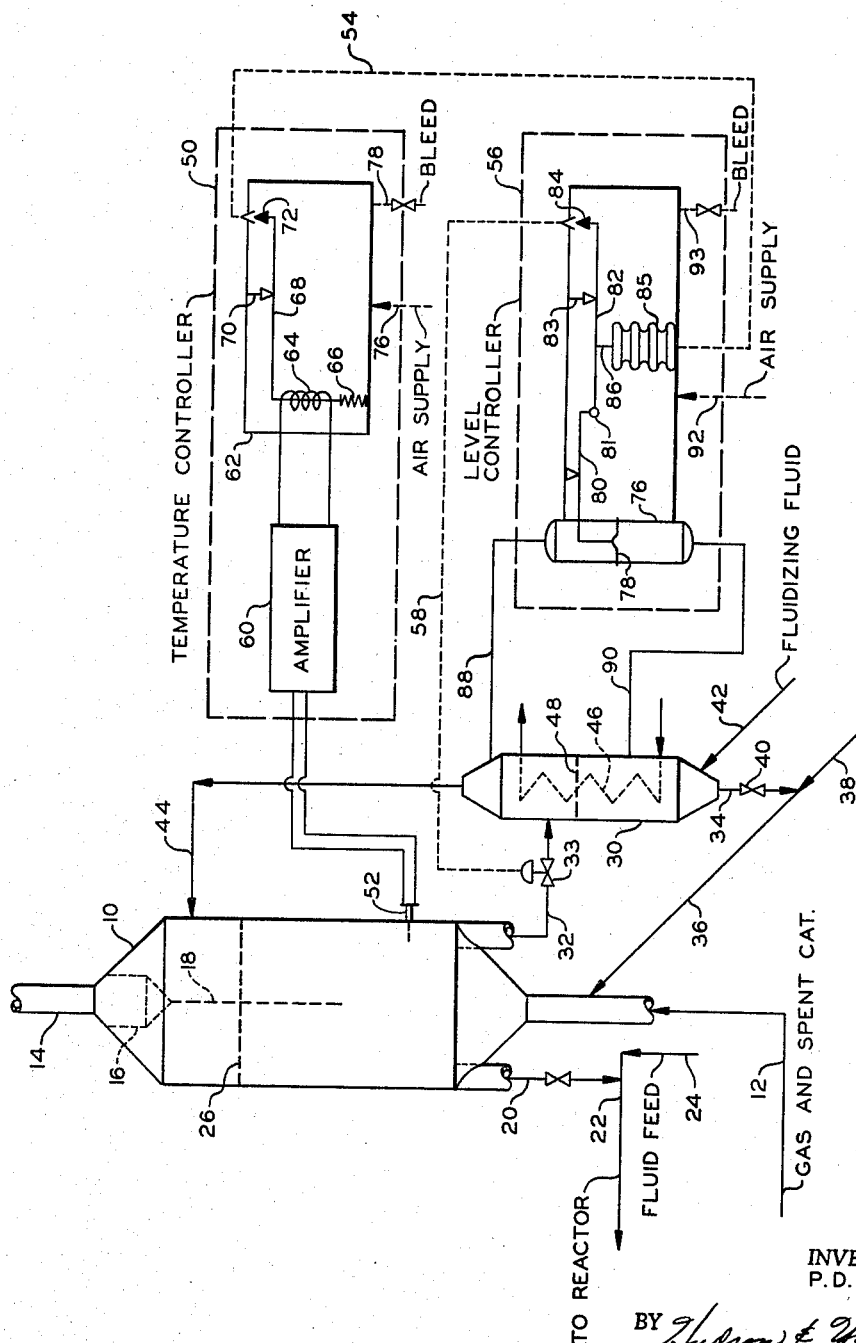

INVENTOR.
P. D. HANN

ATTORNEYS

INVENTOR.
P. D. HANN
BY Hudson & Young
ATTORNEYS ent Office 2,963,422
Patented Dec. 6, 1960

2,963,422

TEMPERATURE CONTROL IN A FLUIDIZED BED REACTOR

Paul D. Hann, Bartlesville, Okla., assignor to Phillips Petroleum Company, a corporation of Delaware Filed Sept. 2, 1958, Ser. No. 758,424

4 Claims. (Cl. 208—160)

This invention relates to a process and apparatus for controlling temperature in a bed of fluidized solids in a reaction zone. A specific aspect of the invention pertains to a process and arrangement of apparatus for controlling temperature in the cracker and in the regenerator in the fluid catalytic cracking of hydrocarbons.

The use of fluidized powdered catalysts in various types of chemical reactions of gases or vapors has come into wide use as a technique, particularly in the petroleum industry. Probably the most common use is in the catalytic cracking of hydrocarbons by contacting higher boiling hydrocarbons in vapor form with finely comminuted cracking catalysts. A number of fluid cracking units with capacities of well over 40,000 barrels per day are in commercial operation. Other hydrocarbon conversion reactions such as hydroforming, hydrocracking, hydrocarbon synthesis by Fischer-Tropsch, etc., are being effected in fluidized catalyst beds.

In fluid catalytic cracking of hydrocarbons using the fluidized catalyst technique, the catalyst in powder form is circulated through a reaction zone in admixture with the hydrocarbon feed under cracking conditions and the catalyst is then circulated through a regeneration zone where carbonaceous deposits are removed therefrom by burning with air. The regenerated catalyst is then recycled to the reaction zone in admixture with hydrocarbon feed to be cracked. The cracking reaction is an endothermic reaction requiring substantial heat input to maintain a selected cracking temperature. The heat for the reaction is supplied by the sensible heat of the feed and catalyst. It is conventional practice to withdraw a minor stream of fluidized catalyst from the reactor and pass the same to a heat exchanger wherein the catalyst is maintained in a fluidized bed in contact with heat exchange surfaces (coils) which raise the temperature of the catalyst for return to the reactor to add sensible heat thereto. One method of operation comprises varying the level of the fluidized bed in the heat exchanger so that it encompasses more hot heat exchange surface, thereby effecting greater temperature increase in the catalyst. Return of the heated catalyst to the reactor directly or in the feed thereto under controlled flow makes it possible to effect more close control of the cracking temperature in the reactor.

A stream of catalyst is continuously withdrawn from the reactor and due to the cracking reaction therein contains an appreciable carbonaceous deposit which reduces the activity of the catalyst and this partially deactivated catalyst is transported by regeneration gas (usually air) into another reactor, designated a regenerator, where the catalyst is maintained in a fluidized bed by the regeneration gas while carbon is burned therefrom. Here again, the regeneration temperature must be controlled at a relatively constant level to avoid overheating and deactivation of the catalyst and so that the recycling of this catalyst to the cracking zone makes it possible to control the cracking temperature; and, here again, the regeneration temperature of the catalyst is controlled, in part, by removing a minor stream of the fluidized catalyst from the regenerator, passing the same to an indirect heat exchanger to cool the catalyst and recycling the cooled catalyst to the regenerator at such a temperature and such a rate as to maintain a relatively constant regeneration temperature.

The process and apparatus of the invention are designed for use in the foregoing types of processes. Accordingly, it is an object of the invention to provide an improved process and arrangement of apparatus for effecting temperature control in a fluidized bed of solids in a reaction zone. Another object is to provide automatic control of temperature in a fluidized-bed reaction zone. Another object is to provide an improved process and apparatus for controlling reaction temperature in a fluidized bed of catalyst particles in either an exothermic reaction zone, such as a regeneration zone utilized for burning carbon off the catalyst, or in an endothermic reaction zone, such as the cracking of hydrocarbons. A further object of the invention is to provide a temperature control process in a fluidized bed reaction zone wherein a minor or auxiliary stream of powdered catalyst is withdrawn, passed through a heat exchanger to change the temperature thereof, and recycled to the reaction zone which requires varying of only the rate of flow to the heat exchanger without varying the rate of flow of the returning catalyst. Other objects will become apparent upon consideration of the accompanying disclosure.

A broad aspect of the inventive process comprises controlling the temperature in a fluidized bed of particulate solids in which a reaction is taking place by withdrawing a minor stream of the solids from the reaction zone, passing the withdrawn stream through an indirect heat exchanger wherein the solids are maintained in a fluidized bed, returning the solids from the heat exchanger to the reaction zone at a constant rate and varying the temperature of the returned stream of solids so as to maintain a relative constant selected reaction temperature. The temperature of the effluent solids from the heat exchanger is controlled by varying the rate of flow of solids to the exchanger thereby changing the level of the fluidized bed in the exchanger and the residence time and, hence, the temperature of the solids therein.

In one embodiment of the invention, a temperature in the reaction zone is sensed by a temperature controller which is in control of a level controller on the exchanger which in turn senses the level of the dense phase of the fluidized bed therein and the level control actuates a motor valve in the effluent line from the reactor leading to the exchanger so as to vary the level of solids in response to temperature variations in the reactor. In another embodiment of the invention, the temperature in the reaction zone is sensed by a temperature controller and this instrument is in control of a second temperature controller sensitive to the temperature in the exchanger and this second temperature controller actuates the motor valve in the solids feed line to the exchanger so as to change the solids temperature in the exchanger in response to changes in temperature in the reactor.

Figure 2:
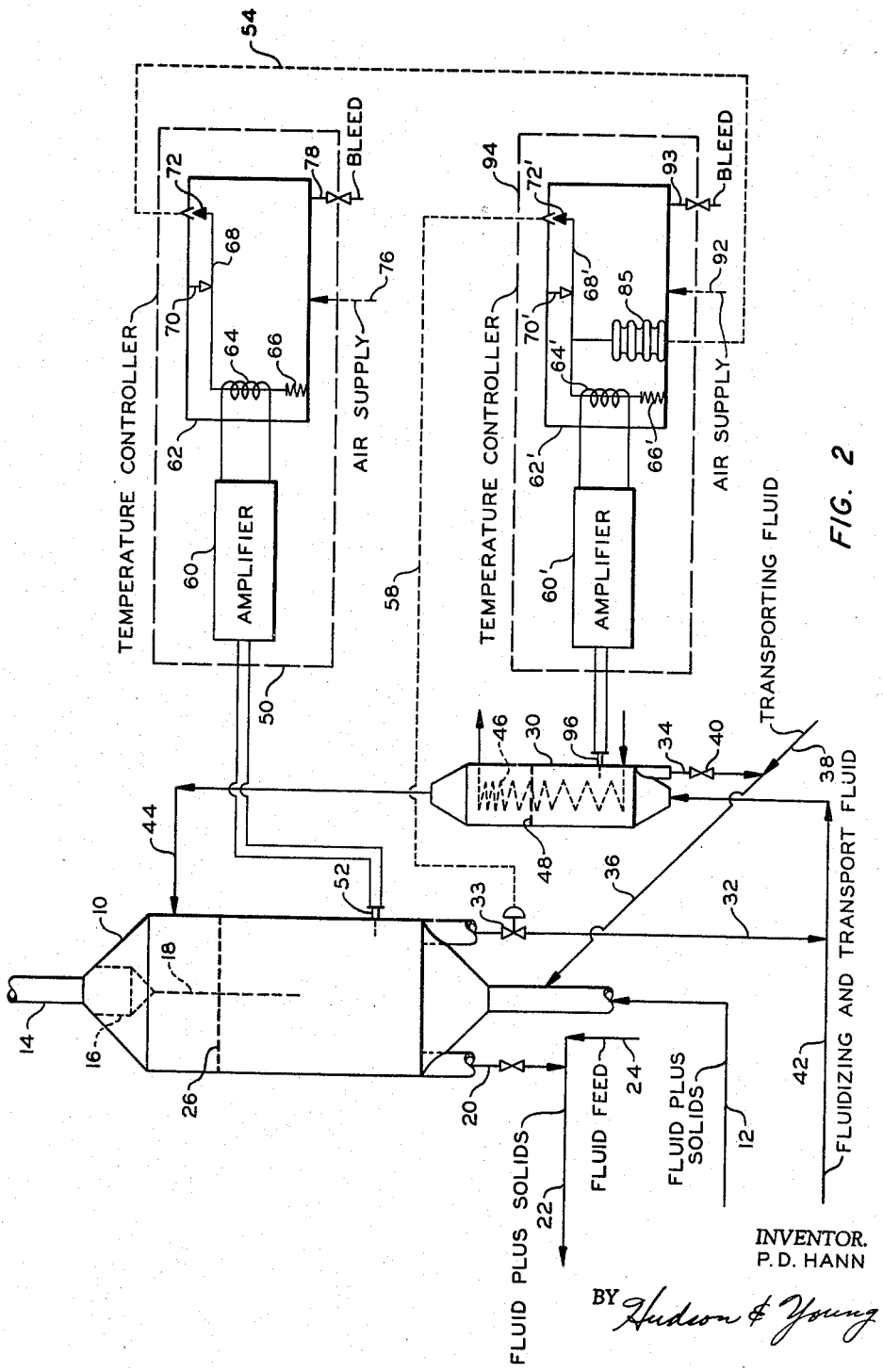

A more complete understanding of the invention may be had by reference to the accompanying schematic drawing of which Figure 1 shows in elevation one arrangement of apparatus in accordance with the invention; and Figure 2 shows another arrangement in elevation of apparatus for effecting the invention. Corresponding elements in the two figures are correspondingly numbered.

Referring to Figure 1, a catalyst regenerator 10 is provided with an inlet line 12 for passing partially deactivated catalyst in suspension in air into the regenerator and with an effluent line 14 for combustion and other effluent gases. A cyclone type separator 16 provided with a return leg 18 is disposed in the upper end of regenerator 10. A catalyst effluent line 20 delivers catalysts to line 22 which leads to a cracking reactor (not shown). Line 24 introduces fluidized gas in the form of hydrocarbon gas or vapor to be cracked, which serves as fluidizing and transport fluid for the regenerated catalyst. The level of the dense phase fluidized bed in regenerator 10 is designated 26. This level is maintained relatively constant by feeding solids into the regenerator through line 12 at substantially the same rate as solids are withdrawn through line 20.

An indirect heat exchanger 30 is connected to a lower section of regenerator 10 by a solids transfer line 32 containing a motor valve 33. An effluent line 34 from exchanger 30 connects with a solids transfer line 36 leading into feed line 12. Line 38 injects at a constant rate fluidizing and transport gas, usually air, into line 36. A constant flow control valve 40 is provided in line 34. Fluidizing gas is introduced to exchanger 30 through line 42 and effluent gas from the exchanger is passed through line 44 into the regenerator above the dense phase for venting through cyclone 16 and line 14.

Heat exchanger 30 contains heat exchange coil 46 which extends from well below the surface of dense fluidized bed 48 to well above the same to provide for varying the contact surface between the fluidized bed of solids and the heat exchange coil by varying the bed level.

One embodiment of the control system comprises a temperature controller 50 connected with a suitable temperature sensing device such as thermocouple 52 in regenerator 10 and in actuating communication thru line 54 with a level controller 56. Level controller 56 senses the level of the solids in exchanger 30 and is in actuating communication with motor valve 33 via line 58. Various forms of temperature controllers adapted for use in the invention are available commercially. One such instrument comprises an amplifier 60 operably connected to an air valve control 62 comprising a solenoid 64, biased by spring 66, connected with an operating arm 68 pivoted at 70 to operate valve 72 leading into air line 54. An air supply line 76 leads into air valve control 62 which is also provided with bleed line 78.

Level controllers of various designs are also available commercially and adaptable to use in the invention as controller 56. The controller shown comprises a pressure cylinder 76, containing diaphragm 78 which operates thru lever 80, and thru connector 81 on another lever 82 which is pivoted at 83 to operate valve 84. A bellows 85 is connected with air line 54 and exerts pressure on lever 82 by means of connector 86, in accordance with the air pressure transmitted to the bellows. The upper end of pressure cylinder 76 is connected by line 88 to the upper end of exchanger 30 and the lower end of the cylinder 76 is connected by line 90 with the lower section of the exchanger well below the bed level so as to render diagraphm 78 sensitive to pressure differential and, hence, bed level in vessel 30. Air supply line 92 and bleed line 93 are connected with the level controller.

To illustrate the operation of the control system of Figure 1, a rise in regenerator temperature causes amplifier 60 to actuate valve control 62 and effect a further opening of valve 72, which causes bellows 85 to further expand, thereby increasing the opening of valve 84. This action effects the further opening of valve 33, by increasing pressure in line 58, to admit more solids to the exchanger as required to reduce regenerator temperature. Valve 40 withdraws cool catalyst at a constant rate so that the level of the dense fluidized bed in the exchanger rises. As the bed level 48 rises, level controller 56 senses the increased ΔP (differential pressure) over the exchanger thru lines 88 and 90, permitting pressure to act on both sides of diaphragm 78 with increased pressure acting on the lower side of diaphragm 78, thereby operating thru levers 80 and 82 to pinch back on valve 84 and pass only sufficient air pressure to valve 33 to return it to its original position. In this manner the flow rate of solids into the exchanger is stabilized so that the flow to and from the exchanger are equalized, but the higher desired level in the exchanger is maintained to produce cooler solids for correcting the variation from the selected temperature in regenerator 10.

As the temperature of the regenerator falls, the reverse operation of that just described takes place.

Referring to Figure 2, the arrangement of most of the apparatus and controls is similar to that of Figure 1 and the discussion of this figure will be limited to the differences. Figure 2 utilizes a different method of introducing solids to exchanger 30, i.e., via line 32, wherein the fluidizing gas is injected thru line 42 which picks up the solids from line 32 and transports them in fluidized condition into the exchanger. Heat exchange coil 46 is different from that shown in Figure 1 in that it provides an increasing amount of heat exchange surface per unit of height from the bottom to the top of the coil. This change in cooling coil area per unit volume of fluidized bed is necessary for proper activation of the controllers, as will become apparent from the ensuing discussion of operation.

Temperature controller 94 is utilized in lieu of level controller 56 and is connected with a thermocouple 96 positioned in the lower section of exchanger 30. Temperature controller 94 is similar to instrument 50 in that it comprises amplifier 60', and air valve control 62'. In addition to the structure of air valve control 62 of Figure 1, 62' of Figure 2 includes a bellows 85 which operates off air pressure in line 54 in the same manner as in Figure 1.

To illustrate the operation of the controls of Figure 2, a rise in regeneration temperature in vessel 10, as sensed by thermocouple 52, causes a further opening of valve 72 which causes bellows 85 to further expand thereby actuating further opening of valve 72'. This increased opening of valve 72' actuates motor valve 33 thru line 58 to increase the flow of solids from regenerator 10 to exchanger 30 as required to change the temperature of the recycled catalyst. Since valve 40 controls the withdrawal of cooled catalyst at a constant rate, the level 48 of the dense fluidized bed in exchanger 30 rises. This rise in catalyst level provides greater cooling in the upper section of exchanger 30 than is effected in the lower section so as to immediately increase the cooling per unit volume of catalyst in the exchanger and this temperature decrease is sensed by thermocouple 96 which actuates temperature controller 94 so as to cause pinching back on valve 72' thereby reducing the pressure on valve 33 so as to re-establish the normal flow rate of catalyst from the regenerator to the exchanger while maintaining the higher level of catalyst in exchanger 30. Both the increased rate of cooling and the longer residence time of catalyst in the exchanger under these conditions provide a lower catalyst outlet temperature from the exchanger, thereby compensating for the higher regeneration temperature and returning same to the desired level.

It is to be understood that the cause of variation in regeneration temperature is generally a change in the coke concentration on the catalyst entering regenerator 10. This change in coke concentration may be due to various changes in the cracking conditions in the cracking zone, such as change in feed, reaction temperature, catalyst activity, pressure, etc. When the coke concentration increases, the temperature rises; and when the coke concentration decreases, the regeneration temperature falls. A fall in regeneration temperature operates the control system conversely to the operation upon a temperature rise as just discussed, effecting a lower rate of flow of catalyst to the exchanger to decrease the fluidized bed level therein so that the catalyst outlet temperature therefrom is higher, thereby correcting the lower regeneration temperature by decreasing the cooling effect of the returned catalyst.

In catalytic cracking, it is generally desired to operate the fluid type regenerator at 1050±25° F. A change in coke content of the spent catalyst charge to the regenerator from the cracker causes a change in the regenerator temperature, e.g., an increase in coke content raises the regenerator temperature and can reach such a level as to destroy the activity of the catalyst. The control system of the invention automatically maintains the regenerator temperature between the desired limits of 1050±25° F.

In typical operation of a fluidized catalytic cracking unit, 340 tons of catalyst per hour is circulated through the regenerator and 17 tons of catalyst per hour through the auxiliary. The auxiliary or heat exchanger flows a steady 17 tons per hour back to the regenerator. To vary the level in the exchanger, the amount of solids passed from the regenerator to the auxiliary or heat exchanger is increased or decreased, temporarily, to raise or lower this level. A higher level effects a colder catalyst returned from the exchanger to the regenerator; and a lower level causes a hotter catalyst to be returned. After the desired level is obtained, the flow from the regenerator to the exchanger again equals the flow of solids from the exchanger to the regenerator at the new level in the exchanger.

Example

Original conditions;

| | |
|---|---|
| Circ. cat. in regen., T./hr. | 340 |
| Wt. percent coke on cat. charged | 1.5 |
| Wt. percent coke on cat. returned | 0.4 |
| Reg. bed temp., ° F. | 1050 |
| Circ. cat. thru exchanger, T./hr. | 17 |
| Temp. in exchanger, ° F. | 950 |
| Level in exchanger, percent of full | 50 |

Upset increases coke on spent catalyst to 1.8% and regeneration temperature rises, thereby actuating control system to flow more than 17 T./hr. to the exchanger, thus raising the level therein as desired. Control cuts the level at 80% of full, in this example, and catalyst temperature in exchanger drops to 850° F. While flow to the exchanger drops back to 17 T./hr., but the new higher level exists in exchanger, thereby returning cooler catalyst and maintaining regenerator temperature again at the desired 1050° F. level.

It is to be understood that the control process and arrangement of apparatus is adaptable to all types of fluidized bed reaction processes, either endothermic or exothermic, wherein it is desired to control the reaction temperature at a relatively constant level.

It is feasible to utilize the heat exchange fluid from the regenerator auxiliary in the reactor auxiliary as the heating fluid and the cooling fluid from the reactor auxiliary as part of the heating fluid for the regenerator auxiliary in a fluid catalytic cracking process to conserve and effect the greatest utilization of heat.

Certain modifications of the invention will become apparent to those skilled in the art and the illustrative details disclosed are not to be construed as imposing unnecessary limitations on the invention.

I claim:

1. A process for controlling the temperature in a reaction zone within a first fluidized bed of particulate solids maintained at a relatively constant level by continuously introducing solids to and withdrawing solids from said reaction zone at a relatively constant rate wherein the temperature tends to vary from a selected reaction temperature, which comprises continuously withdrawing a minor stream of solids from said first bed and passing same to an indirect heat exchange zone to change the temperature of the withdrawn solids; returning a stream of the resulting solids to said first bed at a constant rate; maintaining a second fluidized bed of said solids in said heat exchange zone normally extending to an intermediate level therein; sensing the temperature of said first bed; when the sensed temperature is above the selected reaction temperature, increasing the flow rate of solids to said second bed; when the sensed temperature is below the selected reaction temperature, decreasing the flow rate of solids to said second bed; providing a progressively increasing rate of heat exchange from said intermediate level of said heat exchange zone upwardly therefrom by providing an increasing amount of heat exchange surface per unit of height so that as said second bed level rises, increased cooling rate is effected and as said second bed level lowers, decreased cooling rate is effected so as to compensate for changes in temperature from said selected reaction temperature.

2. The process of claim 1 including the steps of sensing the temperature in said second bed and as the sensed temperature varies from its original temperature, varying the flow rate of solids to said heat exchanger to limit the level of solids therein.

3. Apparatus for controlling the temperature in a reactor within a first fluidized bed of solids therein comprising in combination a fluidized bed reactor; an upright solids heat exchanger provided with means for maintaining a second fluidized bed of solids therein; first conduit means leading from a lower section of said reactor to said exchanger; a variable flow control valve in said first conduit means; second conduit means leading from a lower section of said exchanger to said reactor; a constant flow control valve in said second conduit means; heat exchange means in said heat exchanger having progressively increasing heat exchange capacity upwardly from an intermediate level provided by an increasing amount of heat exchange surface per unit of height and uniform heat exchange capacity below said level, the normal level of solids in said heat exchanger being adjacent said intermediate level; and a temperature controller sensitive to temperature in said first fluidized bed in actuating control of said variable flow control valve for increasing and decreasing the flow rate of solids thru said first conduit as the sensed temperature rises and falls from a selected reactor temperature.

4. The apparatus of claim 3 including a second temperature controller sensitive to the temperature of solids in said heat exchanger in overriding control of aforesaid controller to limit the level of solids in said heat exchanger.

References Cited in the file of this patent

UNITED STATES PATENTS

| | | |
|---|---|---|
| 2,377,935 | Gunness | June 12, 1945 |
| 2,394,710 | McAfee | Feb. 12, 1946 |
| 2,735,802 | Jahnig | Feb. 21, 1956 |
| 2,819,951 | Medlin et al. | Jan. 14, 1958 |

FOREIGN PATENTS

| | | |
|---|---|---|
| 695,338 | Great Britain | Aug. 5, 1953 |